(12) United States Patent
Jabbour et al.

(10) Patent No.: US 9,734,732 B2
(45) Date of Patent: Aug. 15, 2017

(54) COLLAPSIBLE SURGICAL TRAINING APPARATUS AND METHOD FOR LAPAROSCOPIC PROCEDURES

(71) Applicants: Ibrahim Ihsan Jabbour, Middlebury, CT (US); Dada Najjar Jabbour, Middlebury, CT (US)

(72) Inventors: Ibrahim Ihsan Jabbour, Middlebury, CT (US); Dada Najjar Jabbour, Middlebury, CT (US)

(*) Notice: Subject to any disclaimer, the term of this patent is extended or adjusted under 35 U.S.C. 154(b) by 436 days.

(21) Appl. No.: 14/546,385

(22) Filed: Nov. 18, 2014

(65) Prior Publication Data
US 2016/0140876 A1     May 19, 2016

(51) Int. Cl.
*G09B 23/28*     (2006.01)

(52) U.S. Cl.
CPC .................................. *G09B 23/285* (2013.01)

(58) Field of Classification Search
USPC .......................... 434/262, 267, 270, 272, 273
See application file for complete search history.

(56) References Cited

U.S. PATENT DOCUMENTS

| | | | |
|---|---|---|---|
| 5,149,270 A | 9/1992 | McKeown | |
| 5,230,630 A * | 7/1993 | Burgett | G09B 23/28 434/262 |
| 5,403,191 A | 4/1995 | Tuason | |
| 5,425,644 A * | 6/1995 | Szinicz | G09B 23/28 434/267 |
| 5,620,326 A | 4/1997 | Younker | |
| 5,722,836 A * | 3/1998 | Younker | G09B 23/285 434/258 |
| 5,947,743 A * | 9/1999 | Hasson | G09B 23/286 434/262 |

(Continued)

OTHER PUBLICATIONS

Al-Abed et al., A Novel Home Laparoscopic Simulator, Journal of Surgical Education, vol. 66, No. 1 (Jan./Feb. 2009) pp. 1-2.

(Continued)

*Primary Examiner* — Kurt Fernstrom
(74) *Attorney, Agent, or Firm* — Carmody Torrance Sandak & Hennessey LLP

(57) ABSTRACT

A laparoscopic surgery training kit and method is disclosed. The laparoscopic surgery training kit has improved portability and storability because it is collapsible and foldable. The laparoscopic surgery training kit is assembled by unfolding it into a taut condition and inserting a plurality of rods into a plurality of sleeves on a side panel arrangement to place the laparoscopic surgery training kit into its expanded condition. Holes or slits are provided, which are configured to allow insertion of surgical instruments, such as graspers, and/or configured to allow a camera to view the interior of the laparoscopic surgery training kit. In a preferred embodiment, the camera of a smartphone or tablet device is used, which is placed on the laparoscopic surgery training kit using a stand. The image viewed by the camera is shown to the trainee or examinee as a real-time display, preferably at eye-level. The trainee or examinee uses the one or more surgical instruments to manipulate one or more objects contained within the laparoscopic surgery training kit while viewing the real-time display.

20 Claims, 5 Drawing Sheets

(56) References Cited

U.S. PATENT DOCUMENTS

| | | | |
|---|---|---|---|
| 5,947,744 A * | 9/1999 | Izzat | G09B 23/28 |
| | | | 434/262 |
| 5,951,301 A | 9/1999 | Younker | |
| 6,659,776 B1 | 12/2003 | Aumann et al. | |
| 6,887,082 B2 | 5/2005 | Shun | |
| 7,594,815 B2 * | 9/2009 | Toly | G09B 23/285 |
| | | | 434/262 |
| 7,802,990 B2 | 9/2010 | Korndorffer, Jr. et al. | |
| 8,007,281 B2 | 8/2011 | Toly | |
| 8,323,028 B2 | 12/2012 | Matanhelia | |
| 8,403,675 B2 | 3/2013 | Stoianovici et al. | |
| 8,403,676 B2 * | 3/2013 | Frassica | G09B 23/285 |
| | | | 434/267 |
| 8,460,002 B2 | 6/2013 | Wang et al. | |
| 8,469,716 B2 * | 6/2013 | Fedotov | G09B 23/285 |
| | | | 434/262 |
| 8,480,405 B2 * | 7/2013 | Hammerman | G09B 23/285 |
| | | | 434/267 |
| D699,297 S | 2/2014 | Bahsoun et al. | |
| 8,764,452 B2 | 7/2014 | Pravong et al. | |
| 9,520,073 B2 * | 12/2016 | Matonick | G09B 23/306 |

OTHER PUBLICATIONS

Blacker, How to Build Your Own Laparoscopic Trainer, Journal of Endourology, vol. 19, No. 6 (Jul./Aug. 2005) pp. 748-752.

Caban et al., Use of Collapsible Box Trainer as a Module for Resident Education, JSLS, vol. 17 (2013) pp. 440-444.

Laguna et al., Training in Laparoscopic Urology, Current Opinion in Urology, vol. 16 (2006) pp. 65-70.

Long et al., Implementation of a Low-Cost Laparoscopic Skills Curriculum in a Third-World Setting, Journal of Surgical Education (2014) pp. 1-5.

Mughal, A Cheap Laparoscopic Surgery Trainer, Annals of the Royal College of Surgeons of England, vol. 74 (1992) pp. 256-257.

Rassweiler et al., Mechanical Simulators for Training for Laparoscopic Surgery in Urology, Journal of Endourology, vol. 21, No. 3 (Mar. 2007) pp. 252-262.

Ricchiuti et al., A Simple Cost-Effective Design for Construction of a Laparoscopic Trainer, Journal of Endourology, vol. 19, No. 8 (Oct. 2005) pp. 1000-1005.

Ruparel et al., "iTrainers"—Novel and Inexpensive Alternatives to Traditional Laparoscopic Box Trainers, Urology, vol. 83, No. 1 (2014) pp. 116-120.

Scott et al., Laparoscopic Training on Bench Models: Better and More Cost Effective Than Operating Room Experience?, Journal of American College of Surgeons, vol. 191, No. 3 (Sep. 2000) pp. 272-283.

Tan et al., A Randomized Crossover Trial Examining Low- Versus High-Fidelity Simulation in Basic Laparoscopic Skills Training, Surgical Endoscopy (May 31, 2012).

Yoon et al., Development of a Novel iPad-Based Laparoscopic Trainer and Comparison With a Standard Laparoscopic Trainer for Basic Laparoscopic Skills Testing, Journal of Surgical Education (2014) pp. 1-6.

* cited by examiner

COLLAPSIBLE SURGICAL TRAINING APPARATUS AND METHOD FOR LAPAROSCOPIC PROCEDURES

FIELD OF THE INVENTION

The present invention relates generally to laparoscopic surgical training and, more particularly, to a collapsible apparatus and associated method for training in laparoscopic surgery procedures.

BACKGROUND OF THE INVENTION

Laparoscopy is an operation performed on the body cavity through small incisions (usually between 0.5 and 1.5 centimeters in diameter) with the aid of a camera. It can be used to inspect and diagnose a condition or to perform other types of surgeries.

Among other skills, laparoscopy requires keen hand-eye coordination such that a doctor can accurately manipulate surgical tools while only viewing a display screen. Training and practice are required to hone these skills. However, it can be dangerous and expensive for an untrained medical student or medical doctor to practice laparoscopic procedures using humans or animals. Therefore, it is necessary to provide training to medical students and medical doctors in the art and science of laparoscopy using inanimate objects.

To this end, the Society of American Gastrointestinal and Endoscopic Surgeons (SAGES) administers an examination called the Fundamentals of Laparoscopic Surgery (FLS) examination. The FLS comprises both a written and a practical portion. The practical portion of the FLS makes use of a FLS Trainer System manufactured and distributed by VTi Medical. The FLS Trainer system comprises a rigid box with multiple slits at the top of the box into which are inserted medical instruments. A camera is located inside the box that transmits an image to an associated display screen. For the examination, certain objects are placed inside the FLS Trainer System box, which must be accurately and carefully manipulated by the trainee or examinee using the medical instruments while only viewing the display screen.

Many medical students and doctors desire to prepare for the FLS, especially the practical portion of the examination. However, the FLS Trainer System from VTi Medical costs around $2000, which is not reasonably affordable for many medical students and residents. Additionally, the FLS Trainer System comprises a rigid box, which is not highly portable or easily storable. Therefore, many companies manufacture and sell alternative training systems meant to simulate the actual FLS Trainer System used in the examination. These companies include Simulab Corporation, EO Surgical, Inovus Surgical Solutions, 3-D Med, and Ethicon Endo Surgery.

These alternative systems may not be satisfactory. The alternatives generally comprise a rigid box system, like the FLS Trainer System, which is not readily portable or easily storable. Additionally, many of the alternatives provide slits for insertion of medical instruments on a side of the box; whereas, the FLS Trainer System has its slits on the top surface of the box. Thus, these alternatives do not accurately simulate the conditions required for the FLS examination. Finally, many of the alternative systems comprise camera and/or monitor systems, which greatly add to their expense.

SUMMARY OF THE INVENTION

Accordingly, it is an aspect of the invention to provide a laparoscopic surgery training kit and method that can accurately prepare trainees or examinees for the FLS examination.

It is another aspect of the invention to provide a laparoscopic surgery training kit that can be manufactured and sold for a relatively low price.

It is another aspect of the invention to provide a laparoscopic surgery training kit that is portable and easily storable.

One embodiment of the present invention relates to an apparatus comprising a laparoscopic surgery training kit that is alternatively configurable into a collapsible condition or an expanded condition and is alternatively configurable into a folded condition or a taut condition, wherein the laparoscopic training kit comprises: a base surface comprised of a flexible material and circumscribed by a first flexible loop, wherein the first flexible loop is configurable to possess a first resting state wherein the base surface is substantially planar and tautly held by the first flexible loop; a top surface comprised of a flexible material and circumscribed by a second flexible loop, wherein the second flexible loop is configurable to possess a second resting state wherein the top surface is substantially planar and tautly held by the second flexible loop, and wherein the top surface further comprises a first hole configured for accepting an elongated member and a second hole configured to allow viewing there-through by a camera; a side panel arrangement comprised of one or more flexible materials and coupled between the base surface and the top surface, wherein the elongated side panel comprises a plurality of sleeves, each configured to accept a rod; a plurality of rods; wherein insertion of the plurality of rods respectively into the plurality of sleeves creates the expanded condition of the laparoscopic surgery training kit whereby the base surface and top surface are linearly separated; wherein removal of the plurality of rods from the plurality of sleeves creates the collapsible condition of the laparoscopic surgery training kit whereby the top surface is collapsible toward the base surface; wherein twisting of the first and second flexible loops creates the folded condition of the laparoscopic surgery training kit whereby the base surface and the top surface are respectively folded; and wherein unfolding of the base surface and the top surface creates the taut condition of the laparoscopic surgery training kit whereby the first and second flexible loops resiliently return to the first and second resting states respectively.

Another embodiment of the present invention relates to a method of training a person in laparoscopic surgery comprising the steps of: (1) providing a laparoscopic surgery training kit that is alternatively configurable into a collapsible condition or an expanded condition and is alternatively configurable into a folded condition or a taut condition, wherein the laparoscopic training kit comprises: a base surface comprised of a flexible material and circumscribed by a first flexible loop, wherein the first flexible loop is configurable to possess a first resting state wherein the base surface is substantially planar and tautly held by the first flexible loop; a top surface comprised of a flexible material and circumscribed by a second flexible loop, wherein the second flexible loop is configurable to possess a second resting state wherein the top surface is substantially planar and tautly held by the second flexible loop, and wherein the top surface further comprises a first hole configured for accepting an elongated member and a second hole configured to allow viewing there-through by a camera; a side panel arrangement comprised of one or more flexible materials and coupled between the base surface and the top surface, wherein the elongated side panel comprises a plurality of sleeves, each configured to accept a rod; a plurality of rods; wherein insertion of the plurality of rods respectively into the plurality of sleeves creates the expanded condition of the laparoscopic surgery training kit whereby the base surface and top surface are linearly separated; wherein removal of the plurality of rods from the plurality of sleeves creates the collapsible condition of the laparoscopic surgery training kit whereby the top surface is collapsible toward the base surface; wherein twisting of the first and second flexible loops creates the folded condition of the laparoscopic surgery training kit whereby the base surface and the top surface are respectively folded; and wherein unfolding of the base surface and the top surface creates the taut condition of the laparoscopic surgery training kit whereby the first and second flexible loops resiliently return to the first and second resting states respectively; (2) assembling the laparoscopic surgery training kit into the expanded condition and the taut condition; (3) positioning a camera above the second hole; (4) providing a real-time display of the image viewed by the camera to the person; (5) inserting an elongated member through the first hole; and (6) manipulating the elongated member while viewing the real-time display.

Other objects, advantages, and features of the invention will become apparent from the following detailed description, which, taken in conjunction with the drawings, discloses preferred embodiments of the present invention.

BRIEF DESCRIPTION OF THE DRAWINGS

A more complete appreciation of the preferred embodiments of the invention and many of its objects, advantages, and features will be understood by reference to the following detailed description when considered in conjunction with the accompanying drawings, wherein.

DETAILED DESCRIPTION OF THE INVENTION

Figure 1:
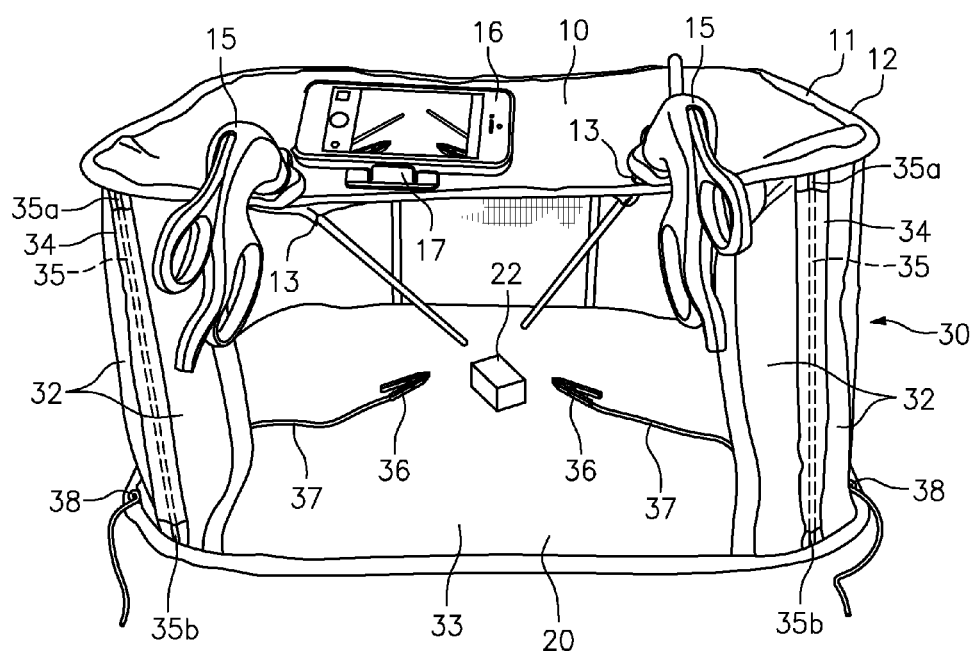
FIG. 1 is a view of the front side of an embodiment of the present invention in use with a smartphone and in its taut and expanded condition.
Figure 2:
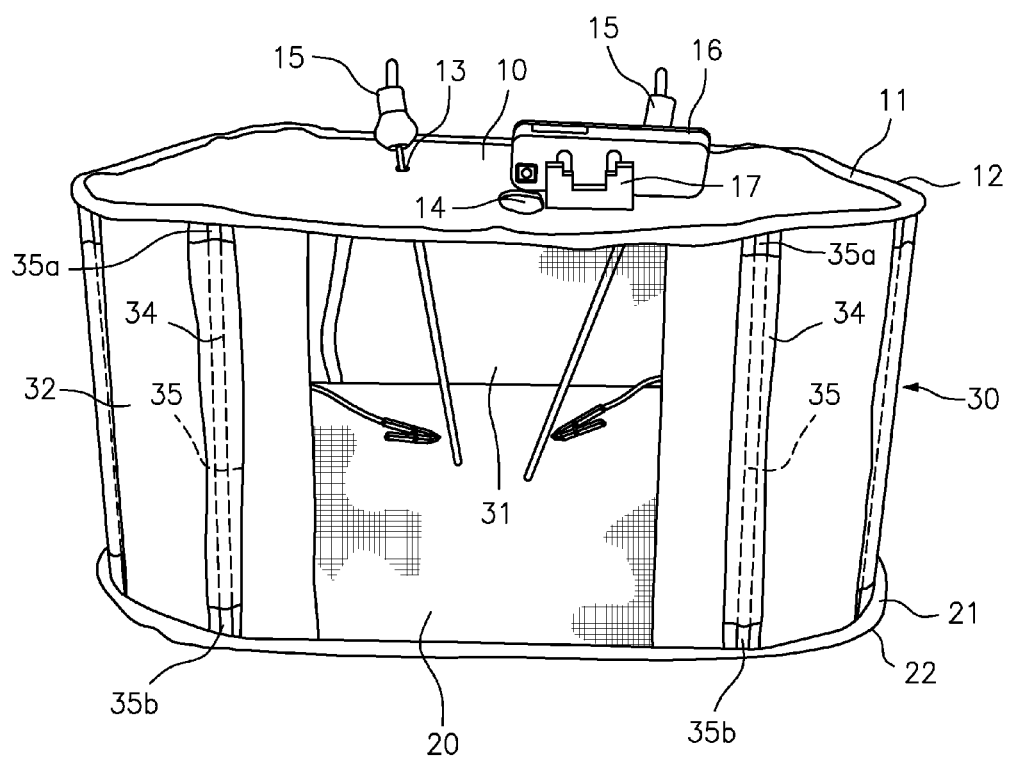
FIG. 2 is a view of the back side of an embodiment of the present invention in use with a smartphone and in its taut and expanded condition.
Figure 3:
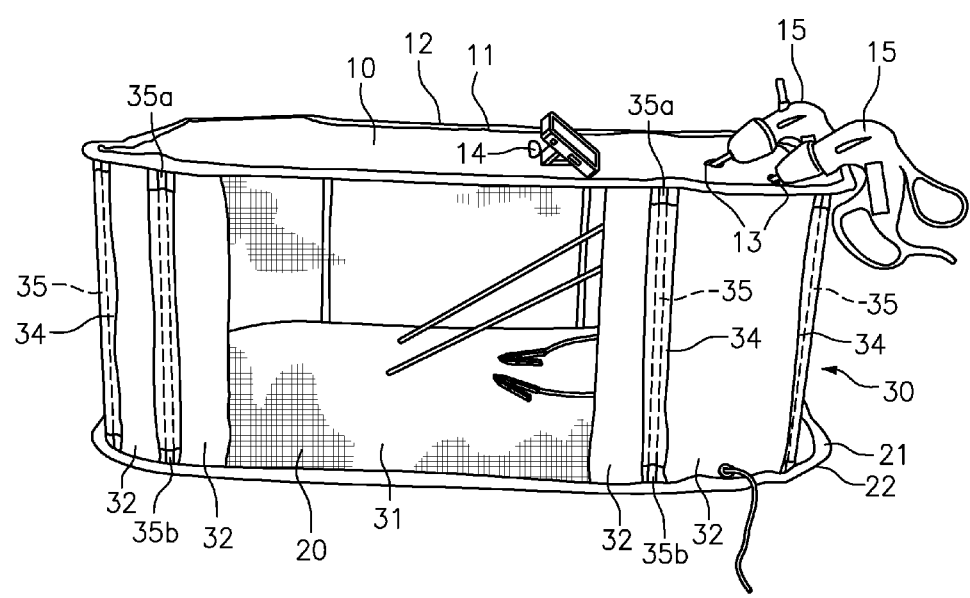
FIG. 3 is a view of the left side of an embodiment of the present invention in use with a smartphone and in its taut and expanded condition.
Figure 4:
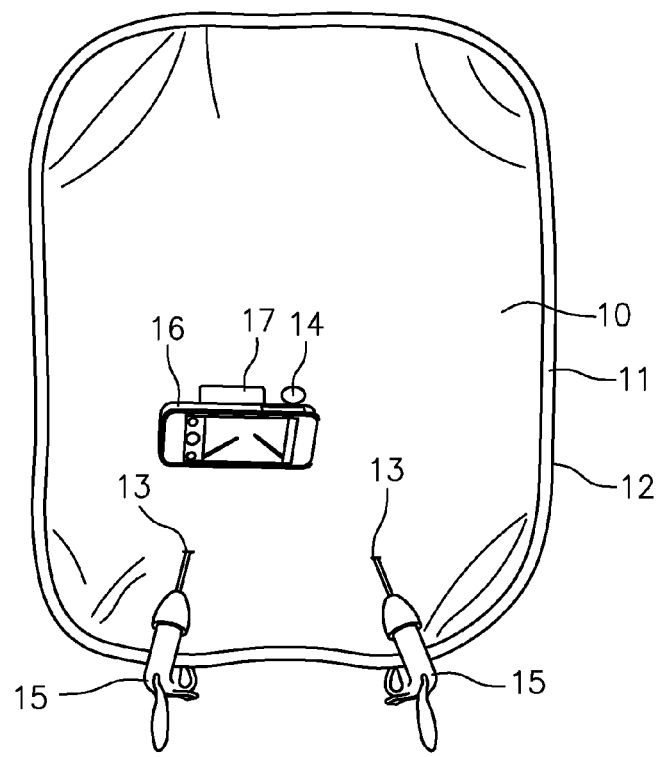
FIG. 4 is a view of the top side of an embodiment of the present invention in use with a smartphone and in its taut and expanded condition.

Reference will now be made in detail to the present preferred embodiment(s) of the invention. Whenever possible, the same reference numerals will be used throughout the drawings to refer to the same or like parts.

Referring to FIGS. 1-4, in a preferred embodiment, a laparoscope surgery training kit comprises a plurality of surfaces, such as a base surface 20, a top surface 10, and a side panel arrangement 30. These surfaces are generally made from a flexible fabric or plastic material, such as a vinyl. The material preferably is able to be folded, but can be held taut without breaking, tearing, or ripping. The surfaces of the laparoscope surgery training kit may also comprise additional materials in discrete portions, such as a flexible mesh material that permits the transmission of light.

Preferably, such mesh material is not used in portions of the base surface 20 or the top surface 10. Preferably, such mesh material can form portions of the side panel arrangement 30. Mesh material makes up a portion of the side panel arrangement 30 in FIGS. 2-3, as shown at 31. These mesh portions 31 allow light to enter into the interior of the laparoscope surgery training kit to better illuminate an object 23 contained therein. Mesh material is preferably not used in the top surface 10 so that a trainee or examinee cannot see into the interior of the laparoscopic surgery training kit while viewing it from the top.

The top surface 10 and the base surface 20 also preferably comprise respective flexible loops 11 and 21. The flexible loops 11 and 21 are preferably made of metal, metal wire, or flexible, resilient plastic. The flexible loops 11 and 21 may have a resting state that is preferably substantially planar and preferably circular, ovular, or polygonal (including rectangular, square, pentagonal, hexagonal, octagonal, etc.). The corners of the polygons can preferably be rounded. The flexible loops 11 and 21 shown in FIGS. 1-6 are rectangular with rounded corners.

Flexible loop 11 is preferably coupled to the top surface 10. In a preferred embodiment, flexible loop 11 is contained within sleeve 12. Sleeve 12 is then coupled to top surface 10, preferably by sewing the edges of sleeve 12 to the side of top surface 10 and/or the side panel arrangement 30. Likewise, flexible loop 21 is preferably coupled to the base surface 20. In a preferred embodiment, flexible loop 21 is contained within sleeve 22. Sleeve 22 is then coupled to base surface 20, preferably by sewing the edges of sleeve 22 to the side of base surface 20 and/or the side panel arrangement 30.

Flexible loops 11 and 21, top surface 10, and base surface 20 are preferably dimensioned such that flexible loops 11 and 21 will hold the top surface 10 and the base surface 20 respectively taut when flexible loops 11 and 21 are in their resting state. "Taut" should be understood broadly. For example, the top surface 10 is taut even if it experiences substantial bowing when an object is placed on top of it. All that is required is that the top surface is held taut enough such that the top surface 10 depresses less than 1 foot at its center when a 1 pound object is placed on its center.

Top surface 10 and base surface 20 are flexible such that each can be folded. Likewise flexible loops 11 and 21 are preferably twistable such that they allow for folding of the top surface 10 and base surface 20. It is preferred that when the top surface 10 and/or the base surface 20 are unfolded, the flexible loops 11 and/or 21 will resiliently return to their respective resting states in a substantially planar shape and holding the top surface 10 and the base surface 20 respectively taut. It is not required that the flexible loops 11 and 21 return to precisely their original shapes.

The top surface 10 also preferably comprises one or more holes 13 configured for accepting an elongated member. The holes 13 may be cuts, slits, slots, or any other breakage in the top surface 10 allowing for insertion of an elongated member. The elongated member is preferably surgical tool, such as a grasper 15. Other preferred elongated members include needle drivers, Endoloops, or scissors. The grasper 15 can be configured to be held and manipulated by a trainee or examinee and preferably possesses an elongated arm that can be inserted into the interior of the laparoscopic surgery training kit.

The top surface 10 also preferably comprises one or more holes 14 configured to allow viewing there-through by a camera. The one or more holes 14 can be any size or shape so long as a camera can be positioned such that its lens can view the interior of the laparoscopic surgery training kit. The one or more holes 14 are preferably located at or near the center of the top surface 10.

In a preferred embodiment, a smartphone 16 can be used as a camera. A trainee or examinee positions the smartphone 16 (which includes tablets or other cameras capable of transmitting an image to another monitor) on top of the top surface 10 such that the smartphone's 16 camera lens points through a hole 14. A stand 17 can be used to help position or angle the smartphone 16.

In one embodiment, the smartphone 16 displays the image seen by its camera on the smartphone's display. In such embodiments, a trainee or examinee will watch the smartphone's 16 display while manipulating the one or more graspers 15 inside the laparoscopic surgery training kit. While such an arrangement and method is within the contemplation of the present invention, it will not precisely mimic testing conditions in the FLS or actual surgery. In laparoscope surgeries performed on a human, the display screen that the surgeon views will generally not be on top of the patient's torso. Instead, the surgeon will view a display screen separated from the patient, and usually at eye level. Therefore, in a preferred embodiment of the invention, a trainee or examinee will operatively link the smartphone with a television, monitor, or other display screen. The smartphone can be linked with the display screen either using wires or through known wireless techniques, such as Wi-Fi. When such embodiments are practiced, the image seen by the camera will be displayed on the display screen.

It is preferred that the display screen be positioned at the eyelevel of the trainee or examinee. The image seen by the camera can be displayed only on the display screen or it can also be displayed on the smartphone's display at the same time. It is preferred that whatever display is used displays the image seen by the camera in real-time. Various objects 23 can be placed inside the cavity on top of the base surface 20. These objects 23 are then manipulated by the trainee or examinee using, for example, the graspers 15 while viewing a display.

The laparoscopic surgery training kit may further comprise a side panel arrangement 30. In the preferred embodiment, the side panel arrangement 30 can comprise portions made from solid flexible materials 32 and portions made from mesh materials 31. The side panel arrangement 30 may be coupled between the base surface 20 and the top surface 10. In a preferred embodiment, the side panel arrangement 30 is coupled to the base surface 20 and the top surface 10 by sewing. The side panel arrangement 30 may also be coupled to the base surface 20 and the top surface 10 by coupling the side panel arrangement 30 to the sleeves 22 and 12 (which are themselves coupled to the base surface 20 and the top surface 10).

The side panel arrangement may be continuous around the entirety of the base surface 20 and the top surface 10. However, it is preferable to have one or more gaps (which includes openings of any kind) in the side panel arrangement 30. In a preferred embodiment, the side panel arrangement has a gap 33 on one side of the laparoscopic surgery training kit. The gap 33 allows a trainee or examinee to place various objects into the interior of the laparoscopic surgery training kit, which can then be manipulated using the graspers 15. The gap 33 also allows light to pass into the interior of the laparoscopic surgery training kit to better illuminate any objects contained therein, thereby improving the quality of a camera's image of the interior of the laparoscopic surgery training kit.

The side panel arrangement 30 may also comprise a plurality of sleeves 34 each configured to accept a rod 35. The sleeves 34 themselves are preferably made from a flexible material such that when the rods 35 are not inserted, the top surface 10 can collapse towards the base surface 20. In a preferred embodiment, the sleeves 34 may extend the entire width of the side panel arrangement 30 from the base surface 20 to the top surface 10. It may also be preferred to couple the sleeves 34 to the base surface 20 and/or the top surface 10, such as by sewing.

The laparoscopic surgery training kit may further comprise a plurality of rods 35. The rods 35 are preferably rigid and can be made of wood, plastic, or metal. It is preferred that the rods 35 have a length that is substantially the width of the side panel arrangement 30 from the base surface 20 to the top surface 10, i.e. the height of the apparatus. Insertion of the rods 35 respectively into each of the sleeves 34 creates the expanded condition of the laparoscopic surgery training kit whereby the base surface and top surface are linearly separated. In one embodiment, after insertion of the rods 35 into the sleeves 34, one end of each rod 35a will come into contact with the inner side of the top surface 10 and the opposite end of the rod 35b will come into contact with the inner side of the base surface 20. It is preferred that the rods 35 come into contact with the top surface 10 and the base surface 20 within the interior of the flexible loops 11 and 21.

In a preferred embodiment, there are eight sleeves 34 and eight rods 35. In the embodiment where the flexible loops 11 and 21 are rectangular with rounded corners, the eight sleeves 34 can be positioned proximate to each side of each rounded corner. In another preferred embodiment, twelve sleeves 34 and twelve rods 35 are used. However, it is possible to use (and within the contemplation of the present invention to use) any number of sleeves 34 and rods 35 including sets in the range of 2-16. Additionally, the sleeves 34 can be located at any locations around the side panel arrangement 30.

It is also possible to use the top surface 10, the base surface 20, and/or the side panel arrangement 30 as anchors for further items to be disposed within the interior of the laparoscopic surgery training kit. In FIG. 1, for example, a pair of alligator clips 36 are anchored to the side panel arrangement 30 in the following way. Each alligator clip 36 is respectively coupled to a string 37. Each string 37 is threaded through a hole in the side panel arrangement 30. The portion of the string extending to the exterior of the laparoscopic surgery training kit through the side panel arrangement 30 is then tied into a knot 38 large enough so that it cannot pass through the hole in the side panel arrangement 30. The alligator clips 36 can then be coupled to an object 23 in the interior of the laparoscopic surgery training kit. Additionally or alternatively, in on embodiment, one or more strips of Velcro can be placed on the base surface 20. Complementary strip(s) of Velcro can be placed on the object 23 placed inside the laparoscopic surgery training kit. The object 23 can then be placed on top of or between the strips of Velcro. In this way, the laparoscopic surgery training kit can simulate anchoring or connectivity of an object in the human body.

Figure 5:
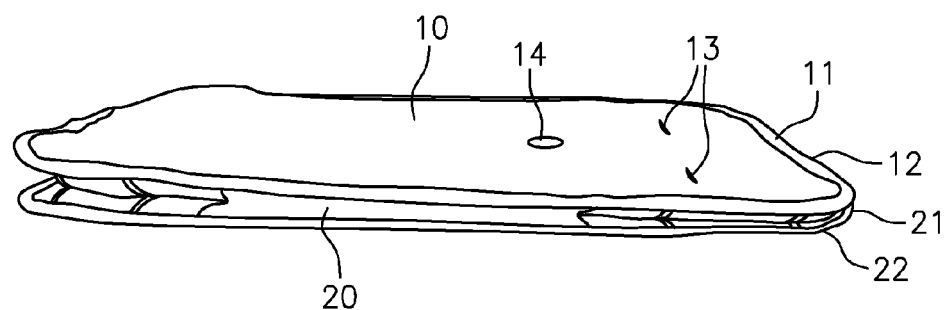
FIG. 5 is a view of the left side of an embodiment of the present invention in its taut and collapsed condition.
Figure 6:
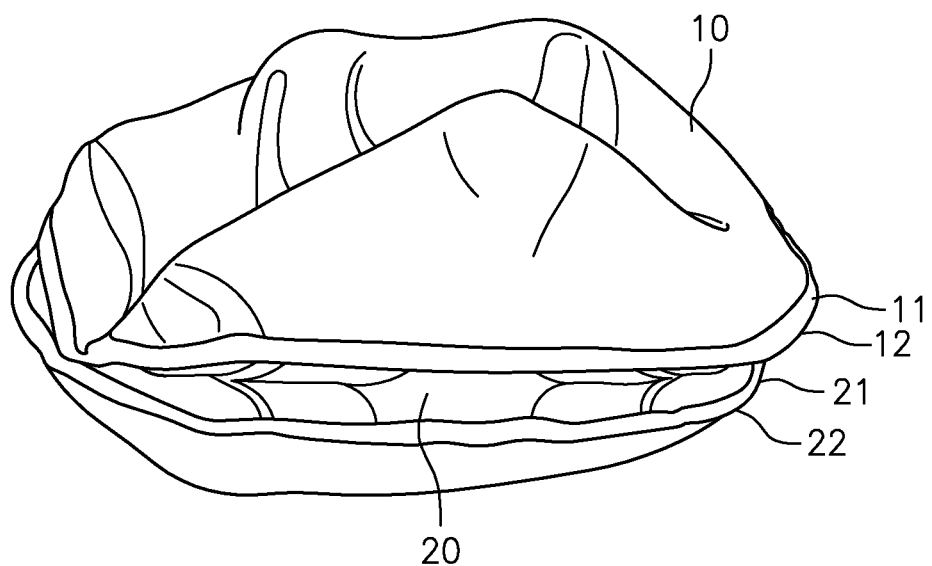
FIG. 6 is a view of the left side of an embodiment of the present invention in its collapsed and folded condition.

In one embodiment, the laparoscopic surgery training kit is alternatively configurable into a collapsible condition or an expanded condition. FIGS. 1-4 illustrate one embodiment of the present invention in the expanded condition, while FIGS. 5-6 illustrate one embodiment of the present invention in the collapsible condition where the top surface 10 has been collapsed toward the base surface 20. Insertion of the plurality of rods 35 respectively into the plurality of sleeves 34 creates the expanded condition of the laparoscopic surgery training kit whereby the base surface 20 and top surface 10 are linearly separated. On the other hand, removal of the plurality of rods 35 from the plurality of sleeves 34 creates the collapsible condition of the laparoscopic surgery training kit whereby the top surface 10 is collapsible toward the base surface 20. This feature aids in the portability and storability of the laparoscopic surgery training kit. When the laparoscopic surgery training kit is not in use, it can be put into its collapsible condition and the top surface 10 allowed to collapse onto the base surface 20.

In one embodiment, the laparoscopic surgery training kit is alternatively configurable into a folded condition or a taut condition. FIGS. 1-5 illustrate one embodiment of the present invention in the taut condition, while FIG. 6 illustrates one embodiment of the present invention in the folded condition. To create the folded condition, the flexible loops 11 and 21 are twisted such that the top surface 10 and the base surface 20 are folded. To create the taut condition, the base surface 20 and the top surface 10 are unfolded, which allows the flexible loops 11 and 21 to resiliently return to their resting states. This feature also aids in the portability and storability of the laparoscopic surgery training kit. When the laparoscopic surgery training kit is not in use, it can be put into its collapsible condition and its folded condition simultaneously.

The present invention is also directed to a method for using the foregoing laparoscopic surgery training kit to help train students or examinees in laparoscopic surgery and to prepare them for the FLS examination. To utilize the laparoscopic surgery training kit, it is assembled into its expanded condition and taut condition, discussed above. One or more elongated members, such as surgical instruments or graspers 15, are inserted into holes 13. A camera is positioned above hole 14. In a preferred embodiment, a smartphone 16 is used as the camera, and it is positioned on a stand 17. The camera provides a real-time display of the image viewed by the camera to the person. The display can be provided on the smartphone 16 or on a display screen associated with the smartphone 16 through wiring or wirelessly. The display is preferably at the eye level of the trainee or examinee. The display can be at an angle. An object 23 is also placed in the interior of the laparoscopic surgery training kit. In a preferred embodiment, the object 23 is anchored by one or more clips 36. A trainee or examinee is then trained using the laparoscopic surgery training kit by practice in manipulating the object using the one or more elongated members while viewing the display.

While particular embodiments have been chosen to illustrate the invention, it will be understood by those skilled in the art that various changes and modifications can be made therein without departing from the scope of the invention as defined in the following claims. The particular embodiments shown and described above are not intended to limit the scope of the invention in any way. Methods illustrated in the various figures may include more, fewer, or other steps. Additionally, steps may be performed in any order without departing from the scope of the invention.

What is claimed is:

1. An apparatus comprising a laparoscopic surgery training kit that is alternatively configurable into a collapsible condition or an expanded condition and is alternatively configurable into a folded condition or a taut condition, wherein the laparoscopic surgery training kit comprises:
    a base surface comprised of a flexible material and circumscribed by a first flexible loop, wherein the first flexible loop is configurable to possess a first resting state wherein the base surface is substantially planar and tautly held by the first flexible loop;
    a top surface comprised of a flexible material and circumscribed by a second flexible loop, wherein the second flexible loop is configurable to possess a second resting state wherein the top surface is substantially planar and tautly held by the second flexible loop, and wherein the top surface further comprises a first hole configured for accepting an elongated member and a second hole configured to allow viewing there-through by a camera;
    a side panel arrangement comprised of one or more flexible materials and coupled between the base surface and the top surface, wherein the elongated side panel comprises a plurality of sleeves, each configured to accept a rod;
    a plurality of rods;
    wherein insertion of the plurality of rods respectively into the plurality of sleeves creates the expanded condition of the laparoscopic surgery training kit;
    wherein removal of the plurality of rods from the plurality of sleeves creates the collapsible condition of the laparoscopic surgery training kit;
    wherein twisting of the first and second flexible loops creates the folded condition of the laparoscopic surgery training kit; and
    wherein unfolding of the base surface and the top surface creates the taut condition of the laparoscopic surgery training kit whereby the first and second flexible loops resiliently return to the first and second resting states respectively.

2. The apparatus according to claim 1, wherein the side panel arrangement further comprises at least one gap.

3. The apparatus according to claim 2, wherein the top surface and the base surface comprise vinyl material.

4. The apparatus according to claim 2, wherein the first loop and the second loop comprise metal wire.

5. The apparatus according to claim 2, wherein the side panel arrangement comprises at least one portion comprising solid flexible material and at least one portion comprising mesh material.

6. The apparatus according to claim 2, wherein the first flexible loop is contained within a first sleeve, the first sleeve coupled to the top surface and wherein the second flexible loop is contained within a second sleeve, the second sleeve coupled to the base surface.

7. The apparatus according to claim 2, wherein the laparoscopic surgery training kit further comprises a stand configured to hold a smartphone.

8. The apparatus according to claim 2, wherein the top surface and the bottom surface are rectangular with rounded corners.

9. The apparatus according to claim 8, wherein the plurality of rods comprises eight rods and the plurality of sleeves comprises eight sleeves.

10. The apparatus according to claim 2, wherein the laparoscopic surgery training kit further comprises at least one clip anchored to the side panel arrangement.

11. A method of training a person in laparoscopic surgery comprising the steps of:
    providing a laparoscopic surgery training kit that is alternatively configurable into a collapsible condition or an expanded condition and is alternatively configurable into a folded condition or a taut condition, wherein the laparoscopic training kit comprises:
        a base surface comprised of a flexible material and circumscribed by a first flexible loop, wherein the first flexible loop is configurable to possess a first resting state wherein the base surface is substantially planar and tautly held by the first flexible loop;
a top surface comprised of a flexible material and circumscribed by a second flexible loop, wherein the second flexible loop is configurable to possess a second resting state wherein the top surface is substantially planar and tautly held by the second flexible loop, and wherein the top surface further comprises a first hole configured for accepting an elongated member and a second hole configured to allow viewing there-through by a camera;
a side panel arrangement comprised of one or more flexible materials and coupled between the base surface and the top surface, wherein the elongated side panel comprises a plurality of sleeves, each configured to accept a rod;
a plurality of rods;
wherein insertion of the plurality of rods respectively into the plurality of sleeves creates the expanded condition of the laparoscopic surgery training kit;
wherein removal of the plurality of rods from the plurality of sleeves creates the collapsible condition of the laparoscopic surgery training kit;
wherein twisting of the first and second flexible loops creates the folded condition of the laparoscopic surgery training kit; and
wherein unfolding of the base surface and the top surface creates the taut condition of the laparoscopic surgery training kit whereby the first and second flexible loops resiliently return to the first and second resting states respectively;
assembling the laparoscopic surgery training kit into the expanded condition and the taut condition;
positioning a camera above the second hole;
providing a real-time display of the image viewed by the camera to the person;
inserting an elongated member through the first hole; and
manipulating the elongated member while viewing the real-time display.

12. The method according to claim 11, wherein the camera is part of a smartphone or a tablet device.

13. The method according to claim 12, wherein the real-time display is at eye-level at a display physically separated from the laparoscopic surgery training kit.

14. The method according to claim 12, wherein image viewed by the camera is transmitted to the real-time display wirelessly.

15. The method according to claim 12, wherein the side panel arrangement further comprises at least one gap.

16. The method according to claim 15, wherein the side panel arrangement comprises at least one portion comprising solid flexible material and at least one portion comprising mesh material.

17. The method according to claim 15, wherein the first flexible loop is contained within a first sleeve, the first sleeve coupled to the top surface and wherein the second flexible loop is contained within a second sleeve, the second sleeve coupled to the base surface.

18. The method according to claim 15, wherein the top surface and the bottom surface are rectangular with rounded corners.

19. The method according to claim 15, wherein the laparoscopic surgery training kit further comprises a stand configured to hold a smartphone.

20. The method according to claim 15, wherein the laparoscopic surgery training kit further comprises at least one clip anchored to the side panel arrangement.

* * * * *